Figure 4:
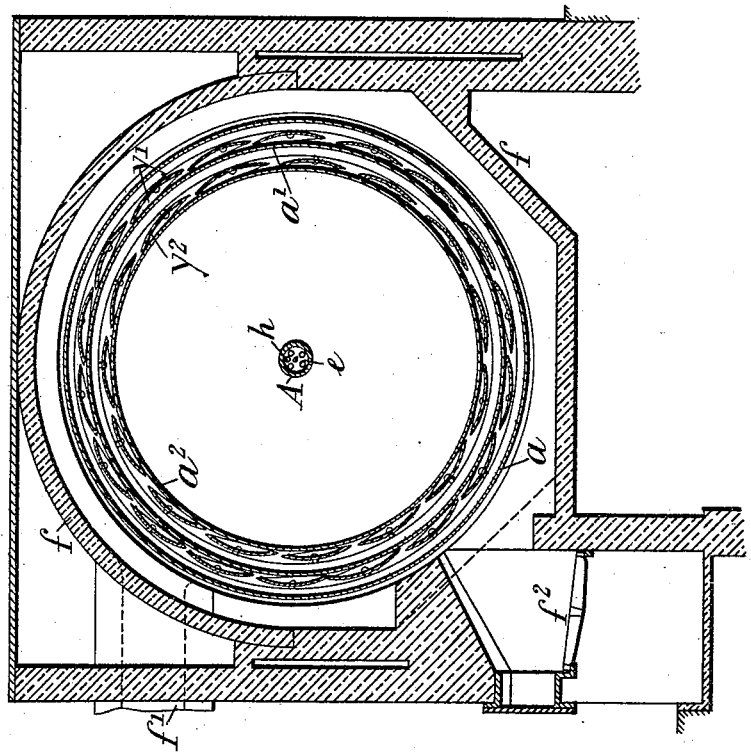

(No Model.) 3 Sheets—Sheet 1.
E. THEISEN.
APPARATUS FOR EVAPORATING OR DISTILLING LIQUIDS.
No. 552,456. Patented Dec. 31, 1895.
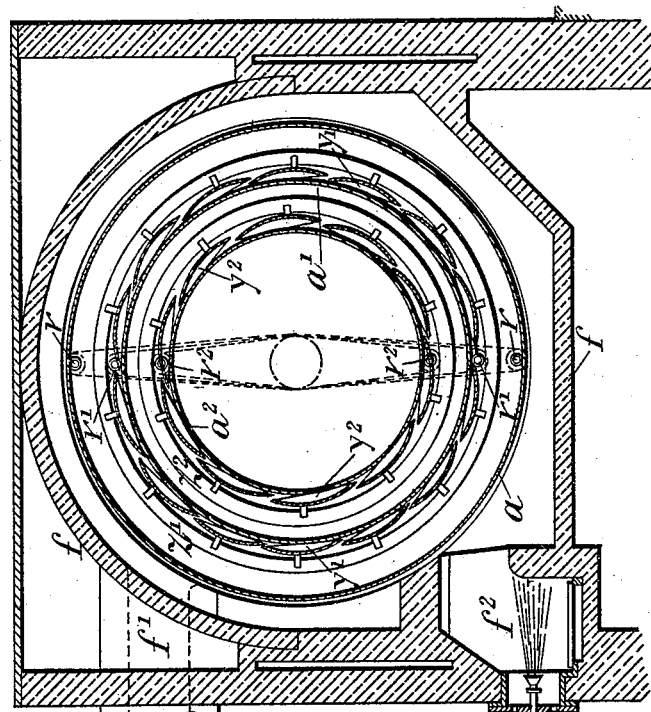
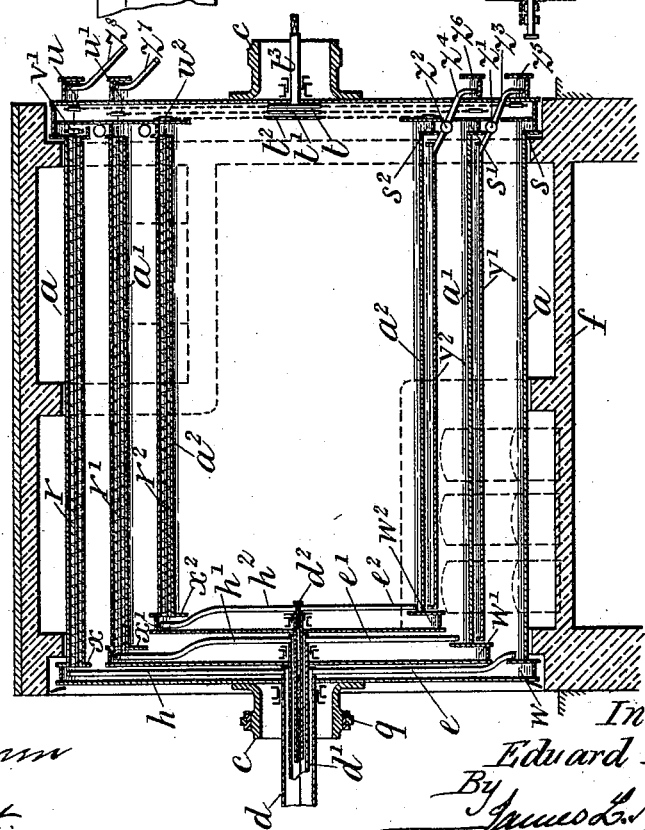
Witnesses.
Inventor.
Eduard Theisen.

(No Model.) 3 Sheets—Sheet 2.

E. THEISEN.
APPARATUS FOR EVAPORATING OR DISTILLING LIQUIDS.

No. 552,456. Patented Dec. 31, 1895.

Witnesses
Inventor
Edward Theisen (No Model.) 3 Sheets—Sheet 3.
E. THEISEN.
APPARATUS FOR EVAPORATING OR DISTILLING LIQUIDS.
No. 552,456. Patented Dec. 31, 1895.
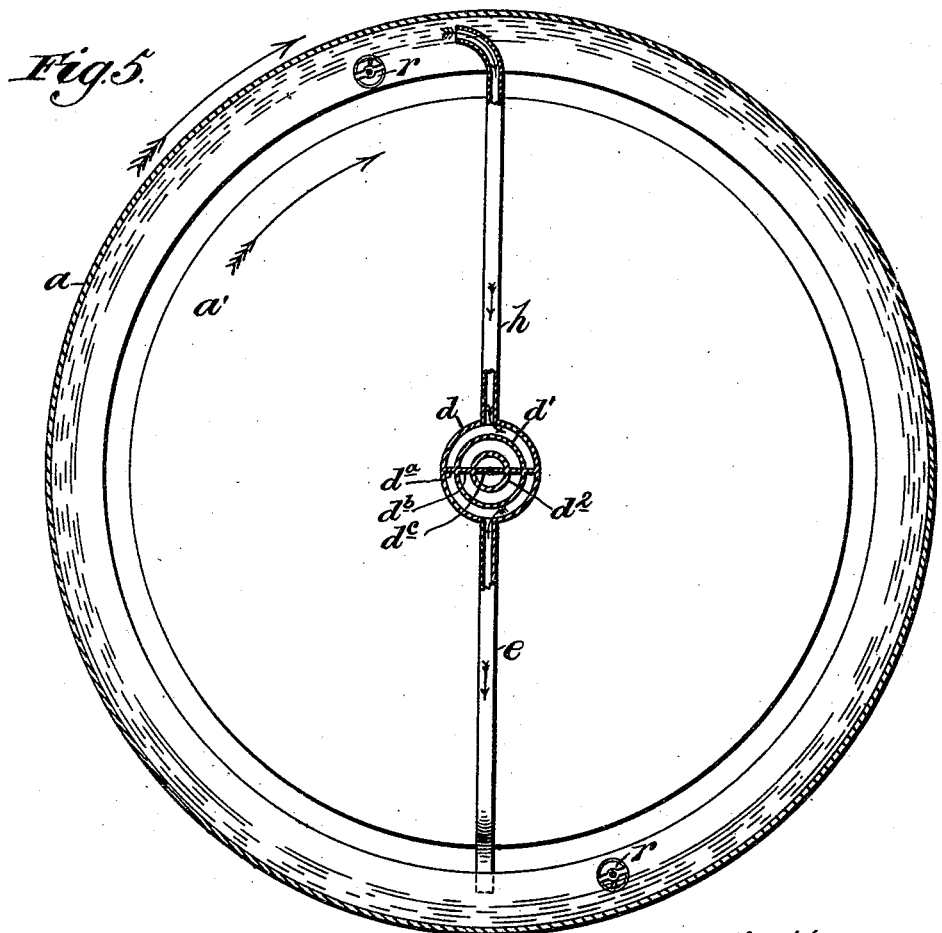
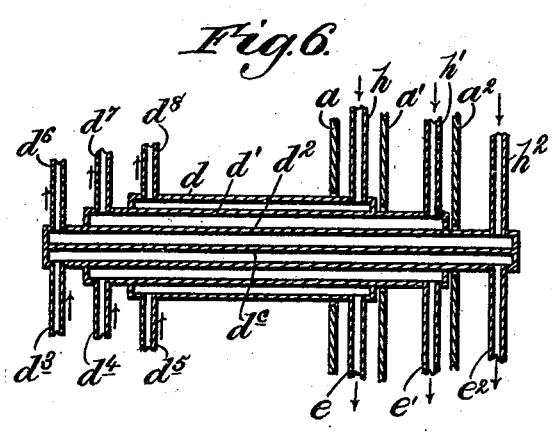
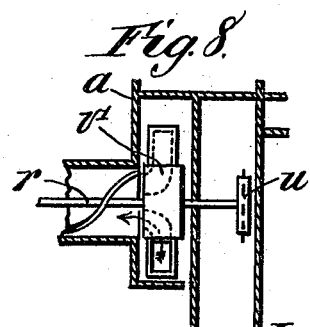
Witnesses.
Robert Emmett
Geo. W. Rea.
Inventor.
Eduard Theisen.
By James L. Norris.
Atty.

UNITED STATES PATENT OFFICE.

EDUARD THEISEN, OF BADEN, GERMANY.

APPARATUS FOR EVAPORATING OR DISTILLING LIQUIDS.

SPECIFICATION forming part of Letters Patent No. 552,456, dated December 31, 1895.

Application filed August 19, 1895. Serial No. 559,839. (No model.)

*To all whom it may concern:*

Be it known that I, EDUARD THEISEN, a citizen of the United States of America, residing at 15 Werderstrasse, Baden, Germany, have invented certain new and useful Improvements in Apparatus for Evaporating or Distilling Liquids, of which the following is a specification.

My invention relates to apparatus for evaporating or distilling liquids in which a revolving drum heated externally is supplied internally with the liquid to be evaporated or distilled in such a manner that the liquid is caused to flow in a thin layer or film over the whole surface of the drum, whereby a very rapid and effectual evaporation is effected, as described in my application bearing equal date herewith. According to my present improvements I arrange two or more such drums concentrically, one within the other, and while the outermost one is heated externally by any suitable means the inner one has heat abstracted from its inner surface, so that a thin layer of liquid being introduced into the interior of the outer drum the vapor produced therefrom by the absorption of heat in coming in contact with the outer surface of the inner drum will be condensed thereby, the resulting liquid being caught in receptacles arranged round such inner drum, and led therefrom to the outside. The apparatus is thus made to act simultaneously as an evaporator and a condenser, and by thus at once condensing the vapors as they rise from a thin layer of liquid a disadvantage is avoided which arises in the distillation of liquids, such as petroleum, in bulk in the ordinary manner, and which consists in that the vapors distilled off become more or less condensed by contact with cooler portions of the liquid, and fall back into the body of the latter, whereby their chemical constitution undergoes a change, resulting in a loss more particularly of the lighter and more valuable portions of the distillate and in an increase in the quantity of the heavier and less valuable residual liquid. In addition to the above advantage this improved construction of apparatus offers the further one of great simplicity and cheapness of construction as compared more particularly with the apparatus at present required for the distilling and refining of the petroleum, which is of a complicated and costly nature.

The invention may be carried out in various ways for operating in the above-described manner. I will describe two such arrangements with reference to the accompanying drawings, in which—

Figure 3:
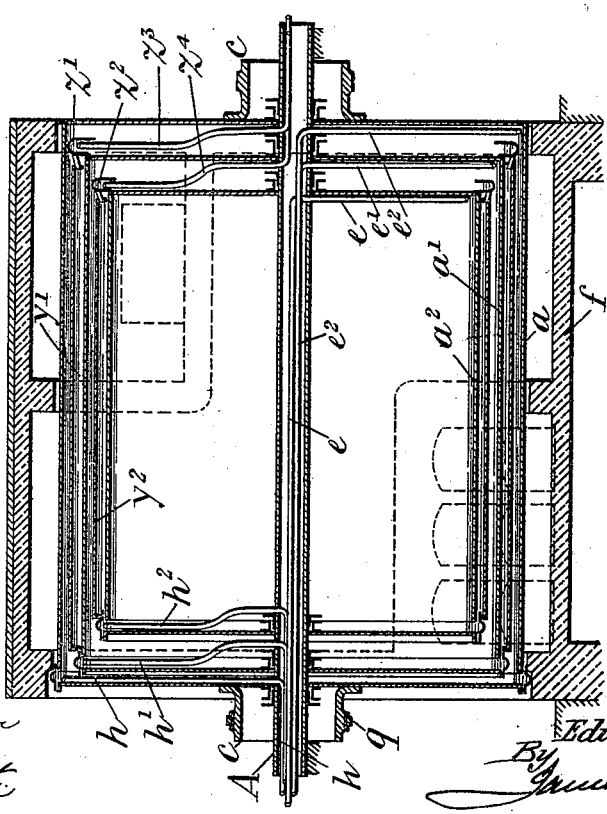

Figure 1 shows a longitudinal section, and Fig. 2 a transverse section, of one construction; and Figs. 3 and 4 show, respectively, a longitudinal and cross section of another construction. Fig. 5 is an enlarged vertical sectional view illustrating the means for conveying the liquid to the exit-tubes. Fig. 6 is an enlarged sectional view illustrating the means for conveying the liquid into and out of the drums. Fig. 7 is a detail of the scoop for delivering the liquid to the worm of the outer drum; and Fig. 8 is a partial section and elevation of the same, showing its operative relation to the worm.

In the arrangement shown at Figs. 1 and 2 there are arranged three concentric drums $a$ $a'$ $a^2$, connected together in any suitable manner, so as all to revolve together, and the outer one $a$ is supported by hollow trunnions $c$, running in suitable bearings, the one trunnion being provided with a toothed ring $q$, with which gears a toothed driving-wheel. Through the one hollow trunnion passes a fixed concentric group of tubes $d$ $d'$ $d^2$, each of which is divided by horizontal partitions $d^a$, $d^b$, and $d^c$, Fig. 5, into two separate channels. The liquid to be treated is introduced into the lower channels of these tubes by means of pipes or other suitable conduits $d^3$ $d^4$ $d^5$, Fig. 6, passes through said channels and enters branch tubes $e$ $e'$ $e^2$, each leading downward into one of the drums, by the rotation of which the liquid is consequently spread by centrifugal action in a thin layer over the entire inner surface of the drums and is at the same time made to travel slowly from the one end of the drums to the other. At the right-hand end each drum has an annular enlargement $s$ $s'$ $s^2$, forming a circular gutter, into which the liquid flows from the drum and in which it is retained by the centrifugal action at a level corresponding to that of the thin layer of liquid in the drum. At diametrically opposite points of each drum are arranged tubular channels containing conveying-worms $r\ r'\ r^2$. These worms communicate with the troughs $s\ s'\ s^2$, the worm $r$ being provided with small scoops $v'$ for this purpose, so that on the worms being rotated they will convey the liquid in the troughs back to the other ends of the drums again. Such rotation of the worms is effected by fixing on the ends of their axes small chain-wheels $u\ u'\ u^2$, over which pass pitch-chains that also pass over larger wheels $t\ t'\ t^2$, fixed on a stationary axis $t^3$, so that as the drums with the worms rotate round the fixed wheels $t\ t'\ t^2$ the chains will be made to impart rotary motion to the worms. The liquid thus conveyed back to the inlet end of the drum there passes into similar trough-shaped enlargements $w\ w'\ w^2$, which are, however, separated from the layer of liquid in the drums by an inwardly-projecting annular partition $x\ x'\ x^2$. Into these troughs $w\ w'\ w^2$ project the scoop-shaped ends of stationary pipes $h\ h'\ h^2$, the other ends of which are fixed to and communicate with the upper channels of the tubes $d\ d'\ d^2$, so that as the drums revolve these pipes scoop up the liquid from the troughs and convey it away through the said channels and exit-pipes $d^6\ d^7\ d^8$. Thus it will be seen that by this arrangement separate bodies of liquid are conveyed, first, by the pipes $e\ e'\ e^2$ into each drum, are then made to travel in thin layers along each drum, where they are subjected to the action of heat, as will be presently explained, are then conveyed by the worms $r\ r'\ r^2$ back to the inlet end, and are finally discharged separately through the pipes $h\ h'\ h^2$ and channels $d\ d'\ d^2$, which convey them into separate receptacles.

On the outer surfaces of the two drums $a'$ and $a^2$ are fixed a number of longitudinal trough-shaped receptacles $y'\ y^2$, so formed, as shown in Fig. 2, as to slightly overlap each other, while leaving spaces for the vapor to pass between them. Each such trough communicates at one end by a branch pipe with a circular pipe $Z'\ Z^2$, from which branch pipes $Z^3\ Z^4$ lead to external annular troughs $Z^5\ Z^6$, fixed on the outer end surface of the drums.

The action of the above-described apparatus is as follows: The drum $a$ is inclosed in a casing $f$, of brickwork or other material, having flues surrounding the drum and leading to a chimney-flue $f'$, and supplied with heat at $f^2$ by means of a liquid, pulverulent, or other fuel in any suitable manner. The drum $a$ as it revolves will consequently be heated externally in a very uniform manner, and this heat will be transmitted through the drum to the thin layer of liquid upon the same, which will consequently be very rapidly evaporated. The vapors thus formed pass through the interstices between the troughs $y'$ and come in contact with the outer surface of the drum $a'$. This drum being cooled by the liquid introduced onto the inner surface thereof through pipe $e'$, the said vapors will be condensed thereon and will be thrown off by the centrifugal force due to the drum's rotation and caught up by the troughs $y'$, which, in overlapping each other, prevent any of the liquid being thrown back into the layer of liquid on the drum $a$. The liquid is held in the troughs $y'$, by the centrifugal action and flows therefrom through the branch pipes into the circular pipe $Z'$ and thence through the branch pipes $Z^3$ to the annular trough $Z^5$, from which it is led off by a stationary scoop-pipe $Z^8$. The heat liberated by the above-described condensation of the vapors is transmitted through the drum $a'$ to the thin layer of liquid therein, which is consequently evaporated thereby, and these vapors are condensed by contact with the outer surface of the drum $a^2$, which is cooled by the thin layer of liquid therein. The condensed vapors are caught by the troughs $y^2$ and the liquid is carried off by the pipes $Z^2\ Z^4$ to the trough $Z^6$, whence it is removed by the scoop-pipe $Z^8$, as above described. The liquid introduced into the drum $a^2$ must of course be of a somewhat lower temperature than that introduced into $a'$, and this must again have a lower temperature than that introduced into $a$ for carrying out the said operation. It will be seen that as by the above-described means the evaporation in drum $a'$ takes place at a lower temperature than in drum $a$ the apparatus is particularly suited for carrying on fractional distillations, such as are required in many manufactures, such as for petroleum distillation, and that in this case the liquid that has circulated through drum $a^2$ can then be made to circulate consecutively through the drums $a'$ and $a$ for distilling off different constituents therefrom by being again introduced into the tubes $d'\ d^2$ respectively.

It will be readily understood that a greater number of concentric drums can be employed if liquids of correspondingly different temperature stages are available.

In some cases it may be desirable that the liquid to be distilled or evaporated shall not be subject to the direct heat of the fire-heat. In that case the outer drum $a$ may serve merely as a steam or vapor jacket for transmitting the fire-heat indirectly to the second drum $a'$, the troughs $y'$ and pipes $Z$, &c., being in that case dispensed with, and the steam or vapor that condenses on the outer surface of drum $a'$ is allowed to fall back into the layer of liquid in $a$. As in the above-described apparatus each inner drum plays the double part of condenser of the vapors of the liquid produced in the preceding drum, and as heater and evaporator of the liquid contained on its own inner surface, it will be seen that the heat produced from the fuel will be utilized in the most economical manner, while the process is rendered capable of very easy regulation, as the quantity of the cooling liquid and the extent of the heating and cooling surfaces can be so proportioned that no undesirable rise of temperature of the liquid can take place. In the arrangement shown at Figs. 3 and 4 the same mode of operating is carried out, the only difference consisting in dispensing with the transporting-worms $r\ r'\ r^2$ of the preceding arrangement, the liquid being at once removed from the drums by scoop-pipes $h\ h'\ h^2$ after it has traveled once along the drum; also, in place of the annular pipes for receiving the condensed liquid from the troughs $y'\ y^2$ open annular gutters $Z'\ Z^2$ are provided at the ends of the drums, into which the liquid flows from the troughs and from which it is removed by scoop-pipes $Z^3\ Z^4$. The supply of the liquid to the drums is also somewhat different in this case, a fixed tubular axis A being provided, on which the combined drums rotate, and through this axis are led the stationary pipes $e\ e'\ e^2$ for supplying the liquid and the scoop-pipes $h\ h'\ h^2$ for discharging the liquid, this being continuously supplied to the drums by the pipes $e\ e'\ e^2$ at the right-hand end, and after traversing the drum in a thin layer continuously withdrawn therefrom at the left-hand end by the pipes $h\ h'\ h^2$. The action of the apparatus is otherwise the same as previously described and need, therefore, not be further referred to. I do not herein claim that invention which is set forth in my application for Letters Patent filed concurrently herewith, and numbered in serial 559,838.

Having thus described the nature of my said invention and the best means I know for carrying the same into practical effect, I claim—

1. In apparatus for evaporating or distilling liquids the combination of two or more concentric revolving drums, means for heating the outer surface of the outer drum, means for supplying liquid to the inner surfaces of all the drums so as to travel in a thin layer over the said surfaces in order to be evaporated by the heat transmitted through them, means for removing the residual liquid from one or more of said drums after it has passed over the surfaces of said drums, and means for withdrawing the portion of the liquid separated by evaporation when condensed substantially as described.

2. In apparatus for evaporating or distilling liquids, the combination of two or more concentric revolving drums, means for heating the outer surface of the outer drum and for extracting heat from the inner surface of the inner drum, troughs carried by the inner drum, means for supplying the liquid to be treated in a thin uniform layer to the inner surface of the outer drum so as to be evaporated by the heat transmitted through the same, the resulting vapors being condensed by the cool surface of the inner drum and the condensed liquid being caught by the troughs on the outside of the inner drum, substantially as described.

3. In apparatus for evaporating or distilling liquids, the combination of two or more concentric revolving drums, means for heating the outer surface of the outer drum, means for supplying the inner surfaces of the outer and inner drums with a thin layer of liquid, means for removing such liquid after it has passed over the surfaces of said drums, and means for catching the liquid resulting from the condensation of the vapor produced in the outer drum on the outer surface of the inner drum, and for conveying it away, substantially as described.

4. In apparatus for evaporating or distilling liquids, the combination of two or more concentric revolving drums, means for heating the outer surface of the outer drum, pipes for conveying the liquid into the internal surfaces of the drums so as to flow in a thin layer over such surfaces, annular trough shaped enlargements at the end of the drums for receiving the liquid after flowing over the surfaces thereof, scoop pipes or equivalent means for taking up the liquid from such annular troughs and discharging it outside the drums, trough shaped receptacles attached to the outer surfaces of the inner drums for catching the liquid resulting from the condensation of vapor on said surfaces, and pipes or channels for conveying the condensed liquid from the troughs to the outside, substantially as described.

In testimony whereof I have signed my name to this specification, in the presence of two subscribing witnesses, this 1st day of August, A. D. 1895.

EDUARD THEISEN.

Witnesses:
KARL HÄHNLLIN,
ERNEST THERION.